United States Patent
Cheney et al.

[11] Patent Number: 5,929,911
[45] Date of Patent: Jul. 27, 1999

[54] MULTIFORMAT REDUCED MEMORY MPEG-2 COMPLIANT DECODER

[75] Inventors: Dennis Phillip Cheney, Vestal; David Allen Hrusecky, Johnson City; Chuck Hong Ngai, Endwell, all of N.Y.

[73] Assignee: International Business Machines Corporation, Armonk, N.Y.

[21] Appl. No.: 08/958,632

[22] Filed: Oct. 27, 1997

[51] Int. Cl.[6] .................................................. H04N 7/50
[52] U.S. Cl. ...................... 348/390; 348/402; 348/416; 348/845
[58] Field of Search .................... 348/390, 402, 348/413, 416, 845, 715, 716; 386/109, 111

[56] References Cited

U.S. PATENT DOCUMENTS

| | | | |
|---|---|---|---|
| 5,477,397 | 12/1995 | Naimpally | 386/111 |
| 5,481,297 | 1/1996 | Cash et al. | 348/13 |
| 5,532,744 | 7/1996 | Akiwumi-Assani et al. | 348/390 |
| 5,535,008 | 7/1996 | Yamagishi | 386/109 |
| 5,557,538 | 9/1996 | Retter et al. | 364/514 |
| 5,583,572 | 12/1996 | Sumihiro | 348/396 |
| 5,598,222 | 1/1997 | Lane | 348/568 |
| 5,598,483 | 1/1997 | Purcell et al. | 382/232 |
| 5,614,952 | 3/1997 | Boyce | 348/392 |
| 5,621,405 | 4/1997 | Park | 341/67 |
| 5,623,311 | 4/1997 | Phillips et al. | 348/396 |
| 5,623,314 | 4/1997 | Phillips et al. | 348/423 |
| 5,862,268 | 1/1999 | Boehlke | 348/458 |

*Primary Examiner*—Howard Britton
*Attorney, Agent, or Firm*—Heslin & Rothenberg, P.C.

[57] ABSTRACT

A digital signal decoder system is provided for receiving digital video signals and processing them while reducing the external memory requirements for frame buffer storage for an MPEG-2 decoder through decimation. The system includes a motion compensation unit for processing macroblock data. The decoder portion of the decimation unit intercepts and processes the data after it has been processed by the motion compensation unit. The data is then stored in the decimate buffer before passing on to the memory control unit. From here the data is routed to the display portion of the decimation unit for further processing. At this point the data is stored in the video buffer where it then passes on to the expansion filter and then to the display. As the video data is routed through the system, it could be decimated, interpolated, reduced, expanded, or any combination of these. The decoder controller controls and synchronizes the system operation. The final result is a system for decoding digital video signals while reducing the external memory requirements. This decoding system can be used to provide features that are desirable for MPEG-2 playback. These include display format conversion to letterbox, and display format conversion to ¾ small picture size with additional storage allocation for on screen graphics.

42 Claims, 9 Drawing Sheets

MULTIFORMAT REDUCED MEMORY MPEG-2 COMPLIANT DECODER

FIELD OF THE INVENTION

The invention relates to digital video decoders, to a method for reducing the external memory requirements for a video decoder system and to editing the format of the video output. More particularly, the invention relates to a method for reducing memory requirements for frame buffer storage for an MPEG-2 decoder, and to editing or modifying the video output, e.g., from a 4:3 form factor of television to a 16:9 format of motion pictures. An important aspect of the invention is decimation of the B-coded pictures. This includes first motion compensating the P-coded, and B-coded pictures, followed by decimating the B-coded pictures during the decode phase, and increasing the size of scan line fetches for the I-coded and P-coded pictures to enable their horizontal decimation during the display phase.

BACKGROUND OF THE INVENTION

MPEG-2 Video Decoder systems often employ external memory, for example, 2 MB or more of external memory, which is generally implemented using DRAM or SDRAM technology. External memory is used for various data areas, or buffers such as frame buffers.

In practice, the use of the MPEG-2 Video Decoder is limited to 2 MB of external memory in order to minimize cost of the end product. Therefore, it is of great importance for the decoder to perform all of its functions within this limitation. Of particular importance is enabling output for both the European markets which utilize the PAL standard which uses 576 video scan lines and the U.S. market which utilizes the NTSC standard of 480 video scan lines.

The MPEG-decompressed video data buffers, also called frame buffers, consume the largest part of External DRAM, therefore they are the prime candidate for memory reduction/compression. Because the frame buffers contain final pixel display and MPEG reference data, the reduction technique must retain high video fidelity in the frame buffers.

Another obstacle faced in video compression/decompression is being able to transform pictures between different sized screens. For example, a motion picture screen is in a 16:9 format, while a television screen is in a 4:3 format. As a result, a method must be provided to convert between 16:9 and 4:3 form factors.

Thus, a need exists for providing an MPEG2 compliant decoder that enables both the PAL and NTSC standards, enables changing format or form factor, and does so within 2 MB of DRAM.

OBJECTS OF THE INVENTION

It is an object of this invention to reduce the space needed to store a B picture for display while leaving all reference pictures at their full resolution. The preservation of the reference pictures at their full resolution will maintain picture quality at high levels, even for long running groups of pictures. This method, while not intended to allow the reduction of memory components of the sub-system, does provide additional space for other data (such as on-screen graphics) without the need for extra memory components.

It is a further objective of the invention to provide a decoder that operates with a minimum of memory required to implement the frame buffers, and in particular, the frame buffer used to store a B picture before its scheduled display time.

It is still a further objective of the invention to provide the ability to transform the presentation format from, e.g. 4:3, to letterbox, e.g. 16:9, using the same decimation unit.

It is yet another object of the present invention to provide the ability to transform the presentation size of the decoded source video stream to ¾ size.

SUMMARY OF THE INVENTION

These and other objects are achieved by the method and apparatus of the invention. In accordance with the present invention a method and apparatus are provided for reducing the external memory requirements for frame buffer storage for an MPEG-2 decoder and decimating the output of the decoder.

An important aspect of the invention is decimation of the B-coded pictures. This includes, first, motion compensating the P-coded, and B-coded pictures during the decode phase, followed by decimating the B-coded pictures, and increasing the size of the scan line fetches for the I-coded and P-coded pictures to enable their horizontal decimation during the display phase.

The method and apparatus of the invention provides a decoder that operates with a minimum of memory required to implement the frame buffers, and in particular, the frame buffer used to store a B picture before its scheduled display time. This reduced memory requirement can be attained by judicious control of a decimation unit which is capable of reducing sub-portions of a decoded image (line of pixels) in such a manner that the picture is recreatable without the knowledge of macroblock boundaries.

The method and apparatus of the invention also provides the ability to transform the presentation format to letterbox using the same decimation unit. Letterbox allows a wide screen format image, typically the 16:9 format image from motion picture film, to be shown in its true form on a regular television monitor, i.e., a 4:3 form factor monitor. Control within the decimation unit allows for the automatic conversion of format between letterbox and normal viewing based on the detection of the delivered aspect ratio information. The letterbox format can be enabled or disabled by the end-user, and if disabled, the wide screen format image is cropped to show only a subsection.

Additionally, the method and apparatus of the invention provides the ability to transform the presentation size of the decoded source video stream to ¾ size vertically. The reduced presentation size may be used along with the on screen graphics in the product to provide features such as a programming guide.

Controls in the decimation unit select which algorithm to employ in processing a given image in order to achieve either a B frame memory reduction, a presentation format, or a presentation size reduction. The compressed MPEG source can be of a variety of sizes and the selection of one algorithm on one particular size source may not yield desirable results if used on a source of different size.

In one embodiment of the invention, a method for decoding macroblock data in a digital video decoding system is provided. The method is carried out in a decoding system that includes a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, and at least one multiplexor. The motion compensation unit processes the macroblock data and sends it to the decoder portion of the decimation unit where the macroblock data is further processed. From here the macroblock data is stored in the decimate buffer until it is passed to the memory control unit for further processing, after which the macroblock data is sent to the display portion of the decimation unit. Control signals which have been processed in the memory control unit are sent to the decimation unit where they are translated before being delivered to the motion compensation unit.

In another embodiment of the invention, a method for decoding macroblock data in a digital video decoding system is provided. The method is carried out in a decoding system that includes a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, at least one multiplexor, and a display fetch unit. The motion compensation unit processes the macroblock data and sends it to the decoder portion of the decimation unit where the macroblock data is further processed. From here the macroblock data is stored in the decimate buffer until it is passed to the memory control unit for further processing, after which the macroblock data is sent to the display portion of the decimation unit. The display fetch unit may then select portions of the macroblock data from the display unit. Control signals which have been processed by the memory control unit are sent to the decimation unit where they are translated before being delivered to the motion compensation unit.

In still another embodiment of the invention, a method for decoding macroblock data in a digital video decoding system is provided. The method is carried out in a decoding system that includes a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, at least one multiplexor, a display fetch unit, and an expansion filter. The motion compensation unit processes the macroblock data and sends it to the decoder portion of the decimation unit where the macroblock data is further processed. From here the macroblock data is stored in the decimate buffer until it is passed to the memory control unit for further processing, after which the macroblock data is sent to the display portion of the decimation unit. The display fetch unit may then select portions of the macroblock data from the display unit. The expansion filter may then expand the macroblock data back to its previous size. Control signals which have been processed by the memory control unit are sent to the decimation unit where they are translated before being delivered to the motion compensation unit.

In yet another embodiment of the invention, a digital video decoding system is provided. The decoding system includes a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, and at least one multiplexor. Alternatively, a display fetch unit and/or an expansion filter may be added to the system.

In an alternative embodiment of the invention, an information handling system is provided. The information handling system includes an enclosure, a power supply, a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, and at least one multiplexor. Alternatively, a display fetch unit and/or an expansion filter may be added to the system.

In another alternative embodiment of the invention, a high definition television is provided. The high definition television includes an enclosure, a power supply, a display screen, a memory control unit for receiving and processing macroblock data and for sending control signals, a motion compensation unit for processing and receiving macroblock data, a decimation unit further comprising a decoder portion, a display portion and a decimate buffer, a plurality of buffers including at least one video buffer, and at least one multiplexor. Alternatively, a display fetch unit and/or an expansion filter may be added to the system.

BRIEF DESCRIPTION OF THE DRAWINGS

FIG. 4 shows the vertical Decimation component. Data is routed from the current register and the old register. A three way adder is used in this example to perform a one of four weighting as, for example, is used for letterbox presentation.

In FIG. 6, B-coded pictures are vertically decimated in decode portion 3 of decimation unit 2. I-coded and P-coded pictures are vertically interpolated in display portion 4 of decimation unit 3.

DETAILED DESCRIPTION

An important aspect of the invention is decimation of the B-coded pictures. Decimation includes first motion compensating the P-coded, and B-coded pictures, followed by decimating the B-coded pictures during the decode phase, and increasing the size of the scan line fetches, i.e., the number of pixels fetched, for the I-coded and P-coded pictures to enable their horizontal decimation during the display phase.

The invention provides a decimation unit that operates on luminance and chrominance macroblock units of picture at the time that the picture is being decoded, and thereafter operates on scan line units of picture data. Decimation is a process of reducing the amount of data by interpolating or averaging combined values to get an interpolated pixel value. Interpolation reduces the number of pixels and, therefore, less memory is required in the overall system. A diagram showing this decimation unit conceptually in an MPEG-2 decoder subsystem can be seen in FIG. 1.

Figure 1:
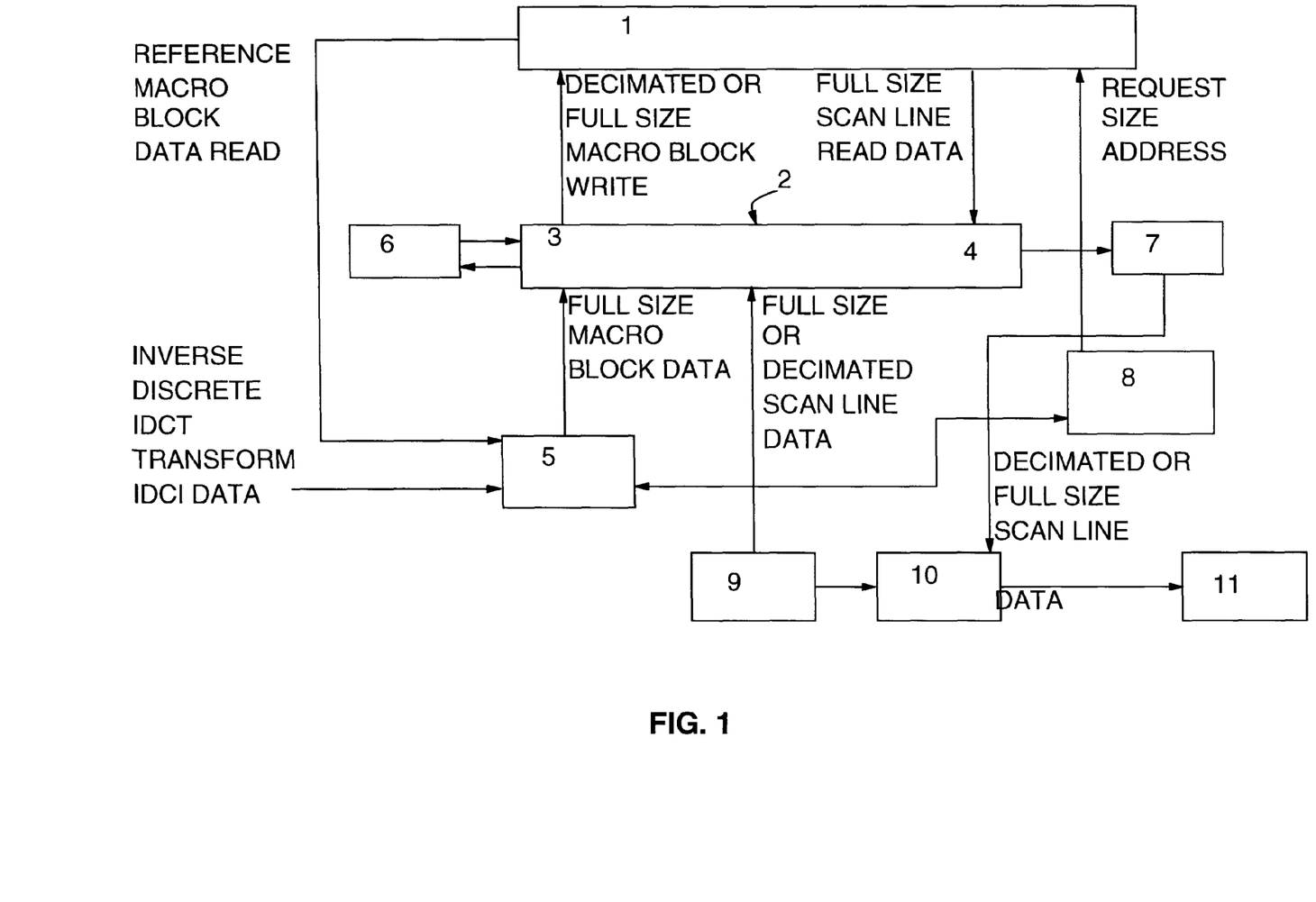
FIG. 1 shows the Decoder subsystem with Decimation Unit data paths. The data flows from motion compensation unit 5 to decode portion 3 of decimation unit 2. Decimate buffer 6 stores data before the data is routed to the memory control unit 1. From here the data passes through the display portion 4 of decimation unit 2 with the aid of display fetch unit 8. Video buffer 7 now stores the data before it is passed through expansion filter 10 and then on to display 11. Decoder controller 9 controls and synchronizes the entire process.

FIG. 1 depicts an apparatus for decoding macroblock data in a digital video decoding system. The system includes a memory control unit 1 for receiving and processing the macroblock data, and for sending control signals for controlling the protocol of the flow of the macroblock data. The system also includes a motion compensation unit 5 for processing and receiving the macroblock data, a decimation unit 2 having a decoder portion 3, a display portion 4 and a decimate buffer 6. Further system components include a display fetch unit 8, an expansion filter 10, a decoder controller 9, at least one video buffer 7 and at least one multiplexor.

The basic building block of an MPEG picture is the macroblock. A macroblock comprises a 16 pixel by 16 pixel array of luminance and chrominance components. The MPEG picture is not simply an array of macroblocks, however. Rather, it is composed of slices, where each slice is a contiguous sequence of macroblocks in raster scan order.

The outermost layer of an MPEG video bitstream is the video sequence layer. Each video sequence is divided into one or more groups of pictures, and each group of pictures is composed of one or more pictures of three different types, I, P, and B. I pictures (intra-coded) are coded independently, entirely without reference to other pictures. P and B pictures are temporally compressed by coding the differences between the picture and reference I or P pictures, thereby exploiting the similarities from one picture to the next.

P pictures (predictive-coded pictures) obtain predictions from temporally preceding I or P pictures in the sequence, whereas B pictures (bidirectionally coded pictures) obtain predictions from the nearest preceding and upcoming I or P pictures in the sequence. B pictures are predicted from preceding and following pictures. Different regions of B pictures may use different predictions, and may predict from preceding pictures, upcoming pictures, both, or neither. Similarly, P pictures may also predict from preceding pictures or use no prediction. If no prediction is used, that region of the picture is coded by intra techniques.

In the system shown in FIG. 1, macroblock data is processed by motion compensation unit 5 and then sent to memory control unit 1. However, before it reaches memory control unit 1, the macroblock data is intercepted and processed by decoder portion 3 of decimation unit 2. The data is then stored in decimate buffer 6 before passing to memory control unit 1. After memory control unit 1 receives and process the macroblock data it is once again sent to decimation unit 2. Here, display portion 4 of decimation unit 2 receives the data and transfers it to video buffer 7 with the aid of display fetch unit 8. Display fetch unit 8 determines the size of scan line fetches for some picture types of scan line data. In order to expand the scanline data it must pass through expansion filter 10.

Control signals are sent from memory control unit 1 to the motion compensation unit 5. However, these signals are intercepted enroute by decimation unit 2 and translated there before reaching their destination at motion compensation unit 5. The decoder controller 9 controls and synchronizes this decoding system.

Decode portion 3 of decimator unit 2 is capable of intercepting macroblock data that has been fully processed by motion compensation unit 5 before the macroblock data is written to memory control unit 1. Depending on the instructions to decimation unit 2, decimation unit 2 may allow a full size macroblock unit to continue writing without alteration, or decimate the macroblock according to a selectable algorithm. When no decimation is to be selected, memory control unit 1 controls the pace of the dataflow. When decimation is selected, decimation unit 2 translates the control signals from memory control unit 1, and generates new control signals to motion compensation unit 5. Decimation unit 2 then controls the data flowing to memory control unit 1 to allow decimation to occur. Decimation unit 2 independently controls the luminance and chrominance macro block units.

It is advantageous to make the transfers to memory control unit 1 as efficient as possible in order to conserve total decoder memory bandwidth. Therefore, decimate buffer 6 is used by decimation unit 2 to collect data that can be sent in packets to memory control unit 1.

With this system, memory control unit 1 and motion compensation unit 5 are as previously described in U.S. Pat. No. 5,576,765 by Cheney et al., hereby incorporated by reference. Modifications are made in motion compensation unit 5 to reorder the data flow to memory for interlaced material carried in a frame structured macroblock. The transmission of data between motion compensation unit 5 and decimation unit 2 is such that the top field data is transmitted before the bottom field data. This removes the need for an extra or larger storage device in decimation unit 2.

Display portion 4 of decimation unit 2 in FIG. 1 operates when the decoded picture is being fetched from memory control unit 1 in scan line form with the intention of producing a raster scan stream of pixel data for display 11. Unlike motion compensation unit 5, display fetch unit 8 is coordinated with the actions of decimation unit 2, and alters the data fetch quantity so as to more appropriately keep video buffer 7 full while decimation unit 2 is operating. This is essential to maintain a seamless flow of pixels to display 11 and thus assure a high quality picture. Like decode portion 3 of decimation unit 2, display portion 4 uses the same set of algorithms to decimate the incoming picture. Display portion 4 operates independently of decode portion 3, and does not share any hardware resources.

The system in FIG. 1 is controlled and synchronized by decoder controller 9, such that all elements of the system coordinate to present a consistent picture. Decoder controller 9 provides control to enable applying a selected decimation algorithm to either the luminance data, or the chrominance data, or both.

Figure 6:
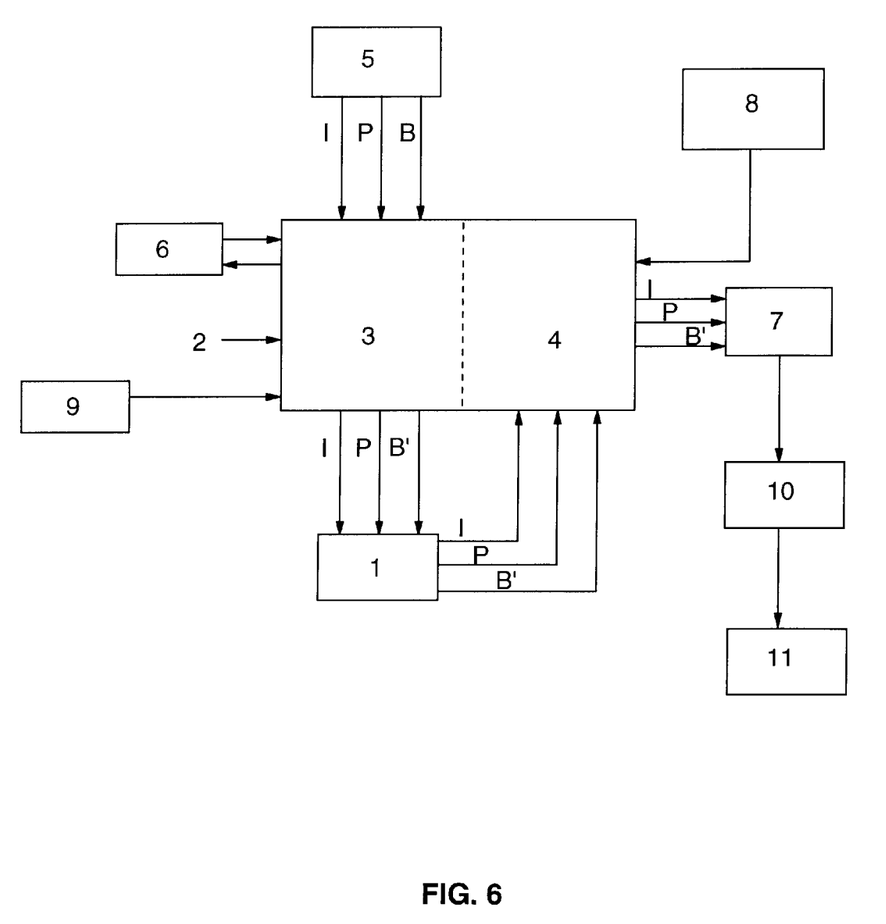
FIG. 6 shows data flow for letterbox presentation. The data flow here is a specific type of data flow similar to FIG. 1.

Thus, with this flexible system, it is possible to perform a number of advantageous processes. One process is to create a "letterbox" presentation, as shown in FIG. 6. This simple case allows the image to be vertically decimated by ¾, and this, as compared to a conventional 4:3 display monitor, creates a 16:9 "letterbox presentation." Decimation allows a 16:9 form factor motion picture image to be shown on a 4:3 form factor television screen without loss of the edges. In this case, the decoded I and P macro blocks proceed through decode portion 3 of decimation unit 2 unaltered, and the B macroblocks are vertically decimated in decode portion 3 of decimation unit 2. On the display side, display fetch unit 8 fetches I and P pictures, and fetches the scan lines in such a way as to allow vertical interpolation down to the same letterbox size as was performed by the decode side. The B picture scan lines would not need to go through this interpolation step, thus all I, P, and B pictures would smoothly display a letterbox picture sequence. This vertical decimation and vertical interpolation can be performed on luminance data only, chrominance data only, or on both luminance data and chrominance data.

"Memory space reduction" is a process which reduces the amount of memory space required for the storage of the decoded B frame, while maintaining high quality for the reference frames (I,P) so as keep the quality of pictures, over the course of a group of pictures, from gradually declining. This is accomplished by horizontally decimating the B pictures 2:1 in the decoding stage. The I and P macroblocks proceed through decimation unit 2 unaltered. On the display side, the display fetch unit 8 increases the size of the scan line fetches for I and P pictures, and horizontally decimates these lines using a 2:1 decimation algorithm. The B picture scan lines need not go through this reduction step. When the I, P, and B lines in turn reach the expansion filter 10, the filter 10 is set to allow a 1:2 expansion, thus regaining I, P, and B lines original size. This process could be done to the luminance data, or the chrominance data, or both. The reduction and subsequent re-expansion of the I and P pictures by display portion 4 of decimation unit 2 is done so that consistency is maintained for the video of a group of pictures, and thus the reduced resolution of any one picture is not noticeable.

Another process is to perform both of the above described processes, and, at the same time. This creates a "letterbox" presentation and still affords saving of external frame buffer memory.

Yet another process is to create a small picture presentation, e.g., for displaying both graphics and text. In this mode, decode portion 3 of decimator unit 2 reduces the displayed image by ¾ vertically, employing the same or similar algorithms used for letterbox presentation. The remaining space on display 11 could be used for on-screen graphics. By additionally reducing B frames as described above, the required external memory to decode the video is reduced, allowing more of the external memory to be allocated toward on screen graphics, i.e. for resolution or color enhancement which could be utilized in this mode of operation.

Data transfers from motion compensation unit 5 to decimation unit 3 are in units of lines, where there are 16 bytes per line. A macroblock comprises one luminance macro block unit comprising 16 lines (256 bytes), and one chrominance macro block unit comprising 8 lines (128 bytes). In this case, the motion compensation unit will first drive out the luminance macro block unit requiring 64 four byte transfers, followed by a chrominance macroblock requiring 32 four byte transfers. The transfer pattern across the macroblock is a frame structured raster; that is, the transfers are de-interlaced.

Figure 2A:
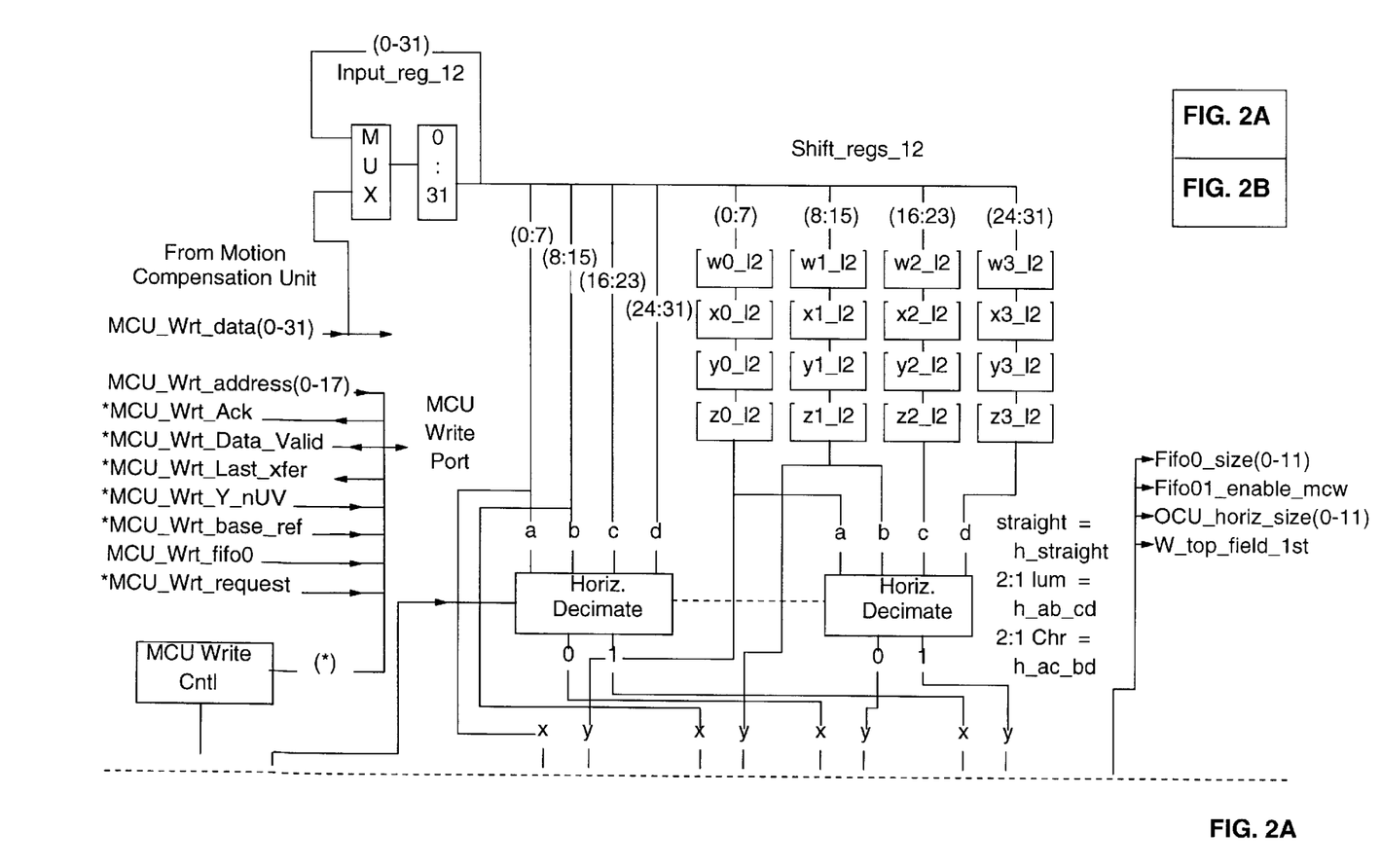
FIG. 2 shows the Decode Decimation Unit data flow. The data is routed from motion compensation unit 5 to decode portion 3 of decimation unit where some of the data is either horizontally decimated, vertically decimated or both horizontally and vertically decimated. Subsequently, the data is stored in decimate buffer 6 until the data flows back through decode portion 3 of decimation unit and into memory control unit 1.
Figure 2B:
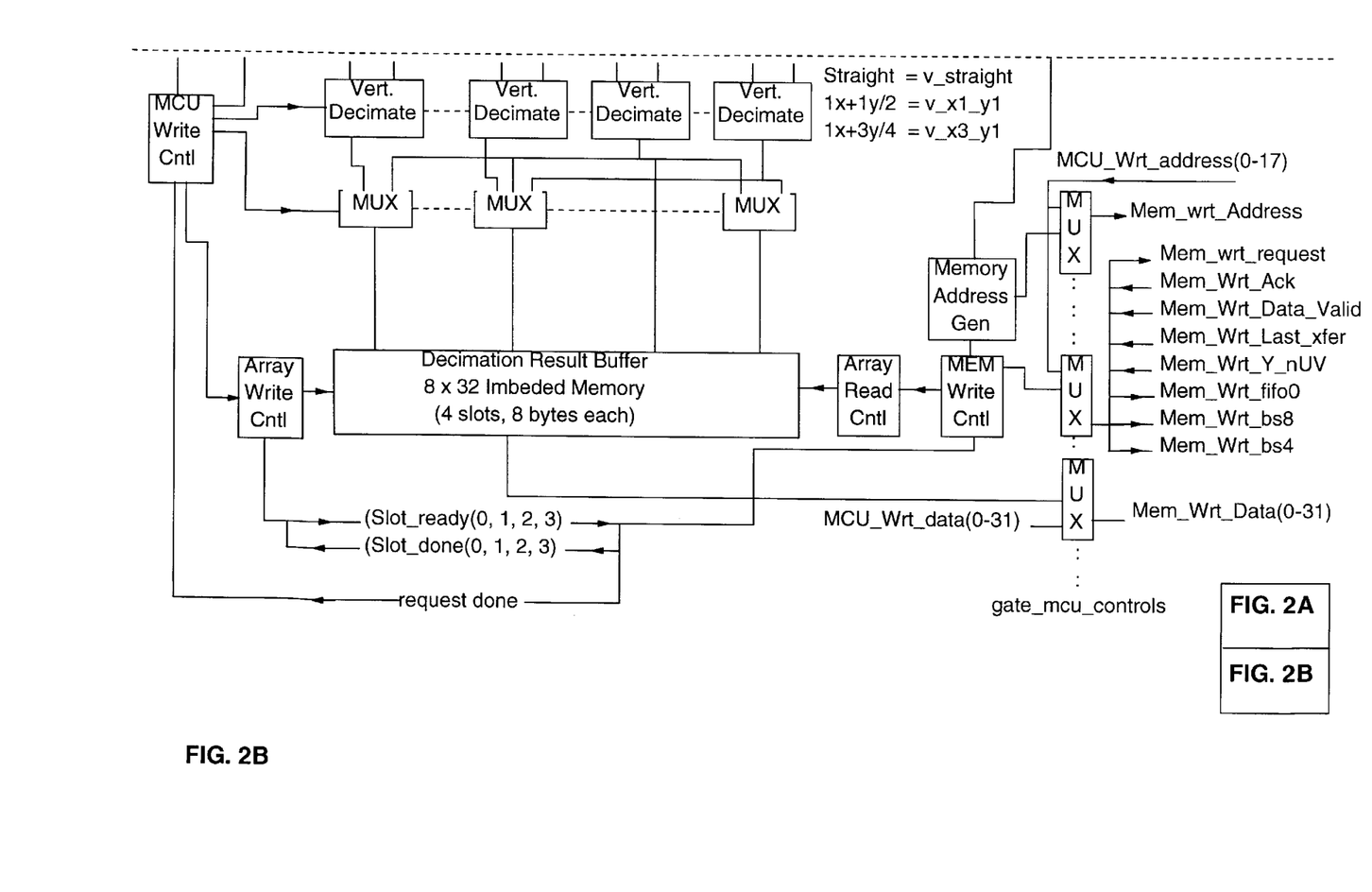

FIG. 2 shows the data flow for the decimation unit. The input register 25 of decode portion 3 of the decimation unit latches up incoming data, for example, 4 bytes at a time. The incoming data is directed toward two or more horizontal decimation components. For example, the left side path is used to process the current line, and is directly coupled to one horizontal decimation component.

The right side path is used during vertical interpolation. A set of staging registers 26 is used to buffer from one line, then as another line is transferred, the buffered data is sent to the right horizontal decimation unit 21 simultaneously with the incoming line data that is sent to the left horizontal decimation unit 20.

Figure 3:
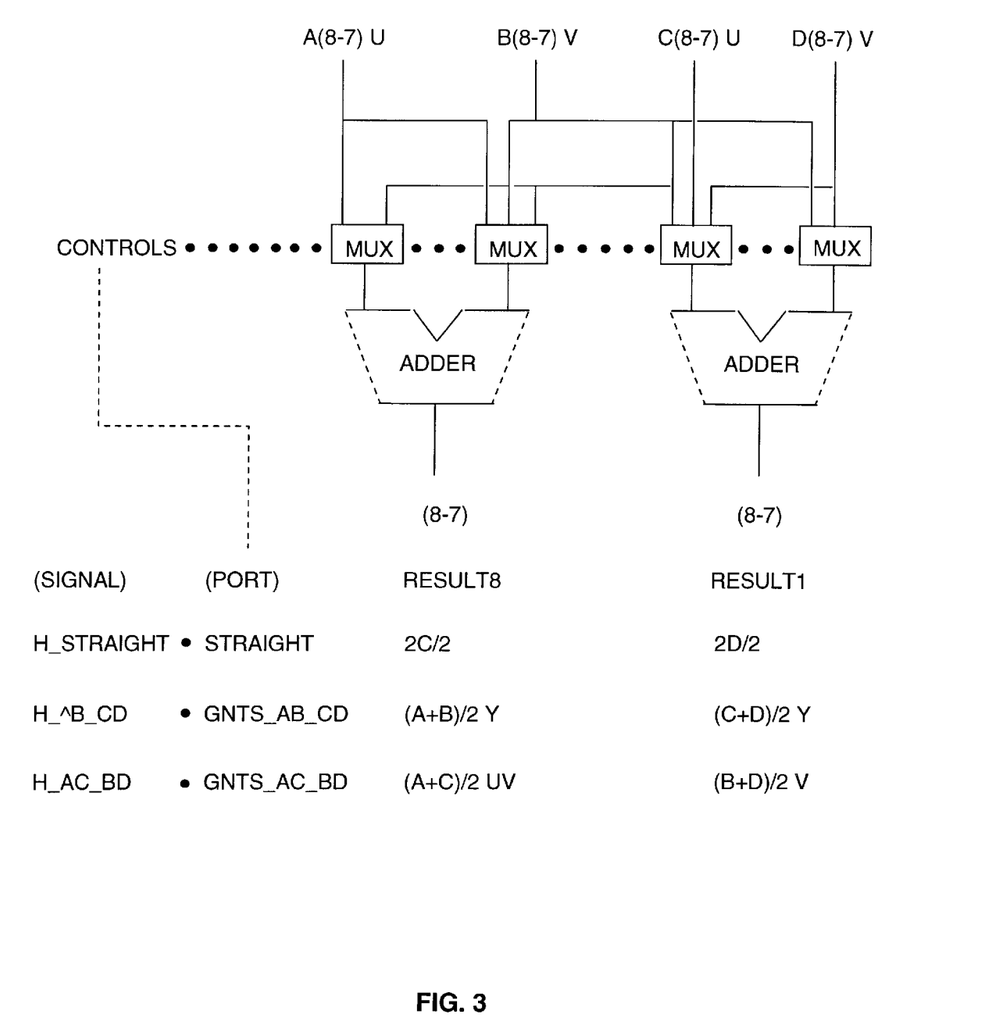
FIG. 3 shows the horizontal Decimation component. Each horizontal decimation unit reduces luminance data or chrominance data. As depicted, for example, the reduction or decimation is by a 2:1 ratio.
Figure 4:
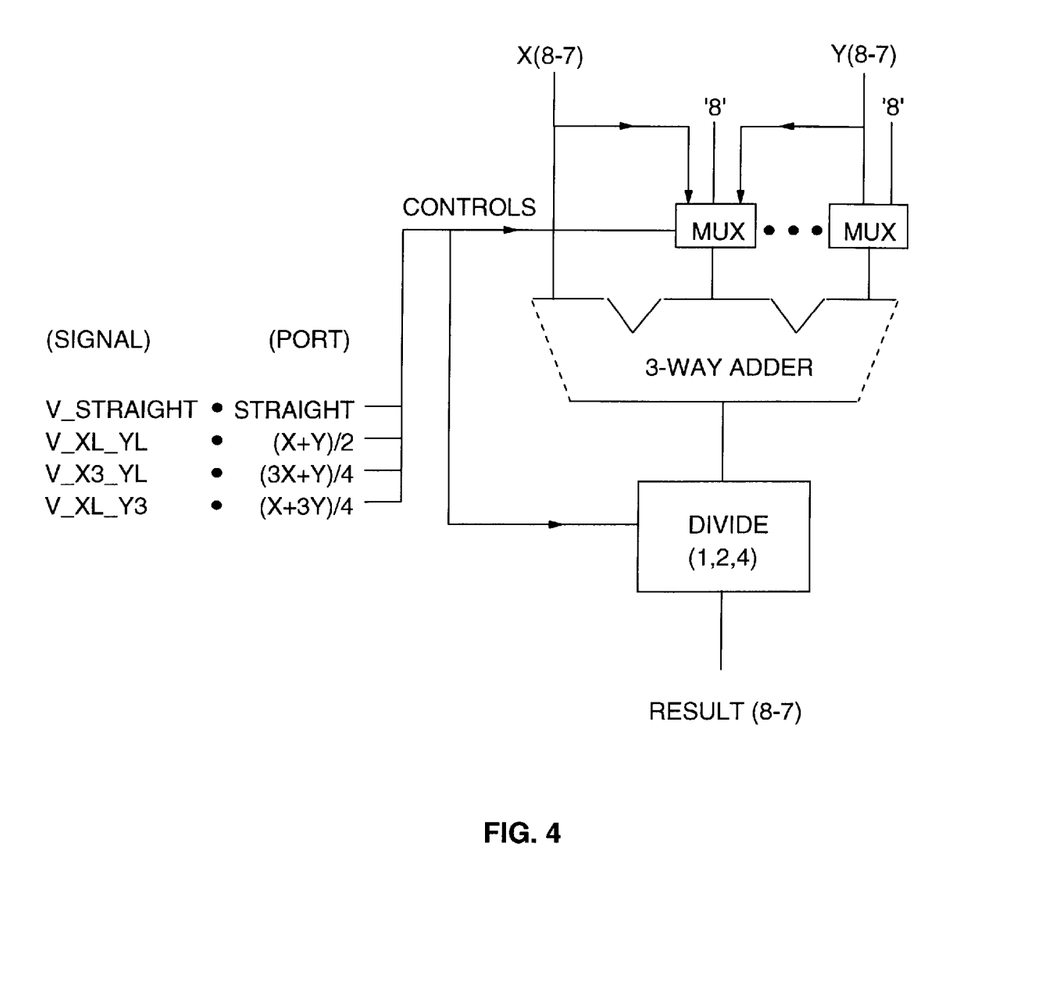

Preferably, horizontal interpolation is performed before vertical interpolation. One or both of these operations will take place while the decimator is active. The horizontal component will take a 4 byte input and reduce it to 2 bytes as shown in FIG. 3. This function also includes a mode where no reduction takes place, eliminating the need for additional multiplexors (mux) in the path. Vertical interpolation uses a weighted average function that either performs a 1:1 average or a 3:1 average between adjacent lines, as shown in FIG. 4.

If there is any vertical interpolation, then the outputs of the two horizontal decimation components 20 and 21 will be processed by the vertical decimation components 24 prior to being written into decimate buffer 6, as shown in FIG. 2. If no vertical interpolation is performed then the data will come through the left side of the data flow, the set of staging registers 26 will not take part in the function and the data will pass straight through.

If there is any horizontal reduction, then data will flow through the right most vertical decimation components 24 in FIG. 2, before being written to decimate buffer 6. If there is no horizontal reduction, then data will flow through all four vertical decimation components 24, and data bytes two and three will pass straight through the horizontal decimation component 21.

Each write cycle into decimate buffer 6 will be a consistent number of bytes, for example, 4 bytes at a time (no horizontal reduction), or 2 bytes at a time (2:1 reduction). During vertical interpolation, there may be pauses in write cycles as the controls wait for two lines to be processed together, or skips lines entirely.

The data flow within decimation unit 2 is controlled by two logically separate engines. The decimate state machine 22 controls the input flow from motion compensation unit 5, through the horizontal and vertical decimation components, and the writing into decimate buffer 6. The outward flow from decimate buffer 6 to the memory controller is managed by logic that is grouped under the category of MEM Write Control 28. Buffer management is accomplished using a set of registers that keep track of data availability within sections of decimate buffer 6. These are the bits in slot_ready_ 12 (0 to 3).

As shown in FIG. 2, when decimation unit 2 is not active, the control signals are routed directly between motion compensation unit 5 and memory control unit 1 by means of a multiplexor 12. This is shown in the lower right side of FIG. 2.

Figure 5A:
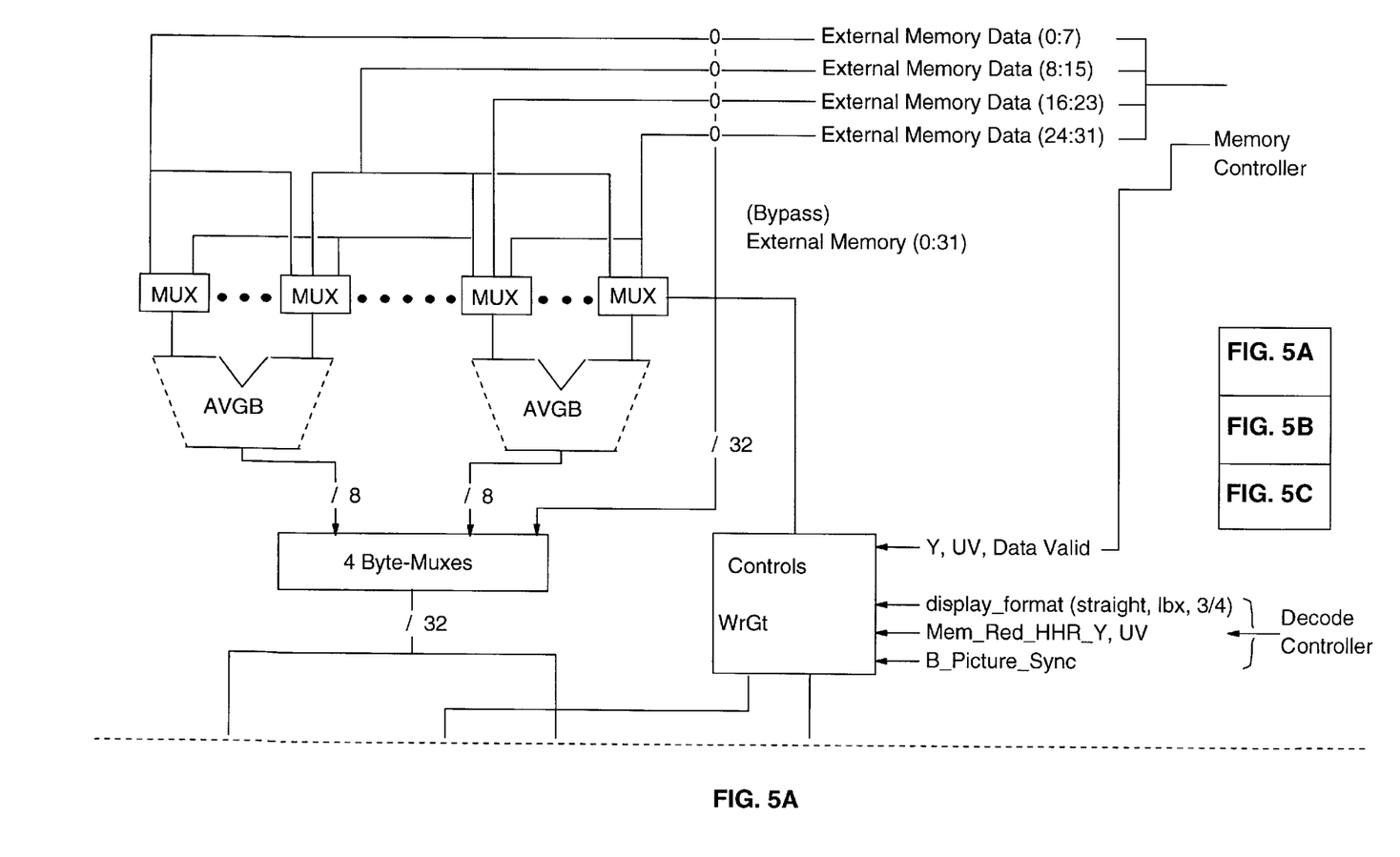
FIG. 5 shows the Display Decimation Unit data flow. The data is routed from memory control unit 1 where some of the data is either horizontally decimated, vertically decimated or both horizontally and vertically decimated. Subsequently, the data is stored in video buffers 7 until the data is routed to expansion filter 10.
Figure 5B:
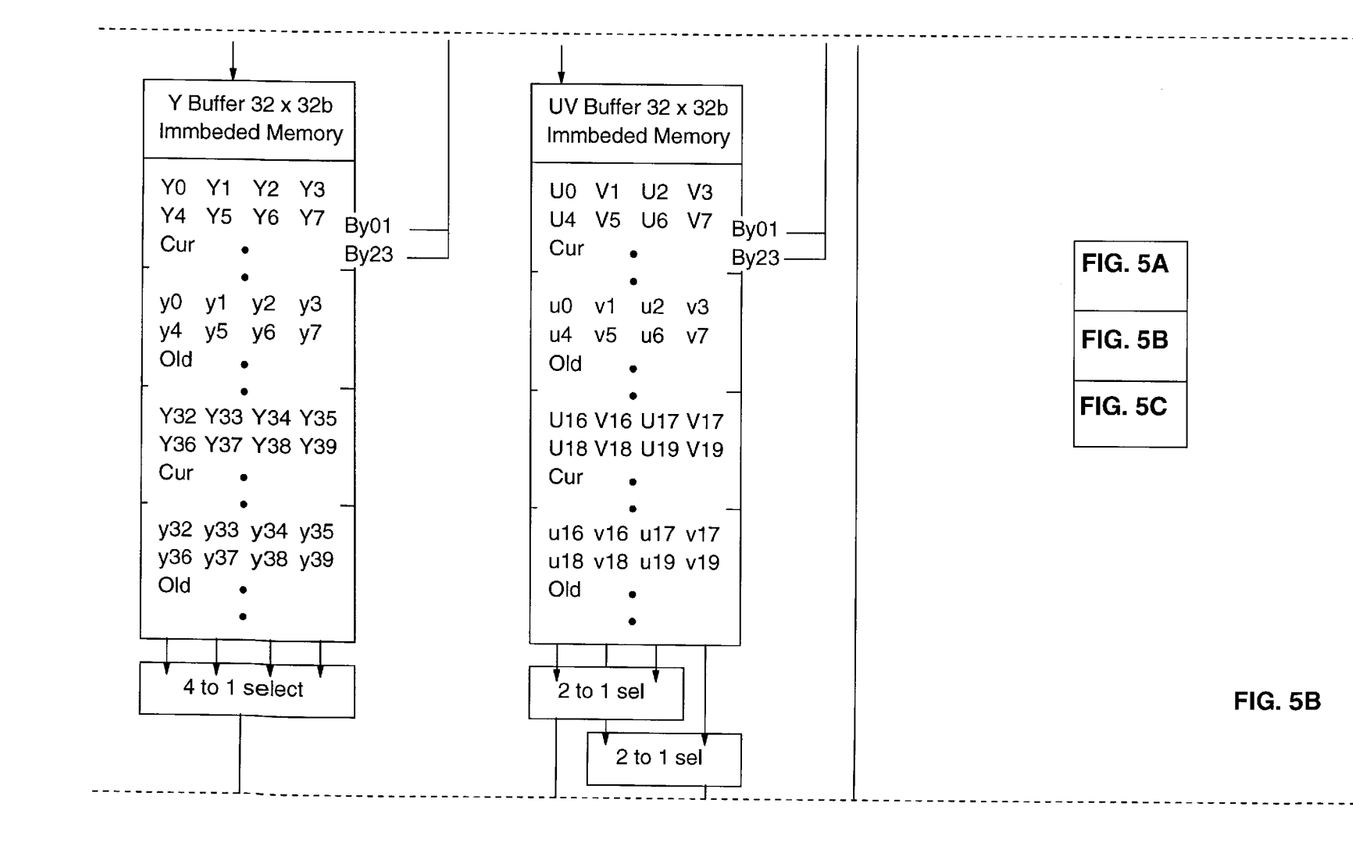
Figure 5C:
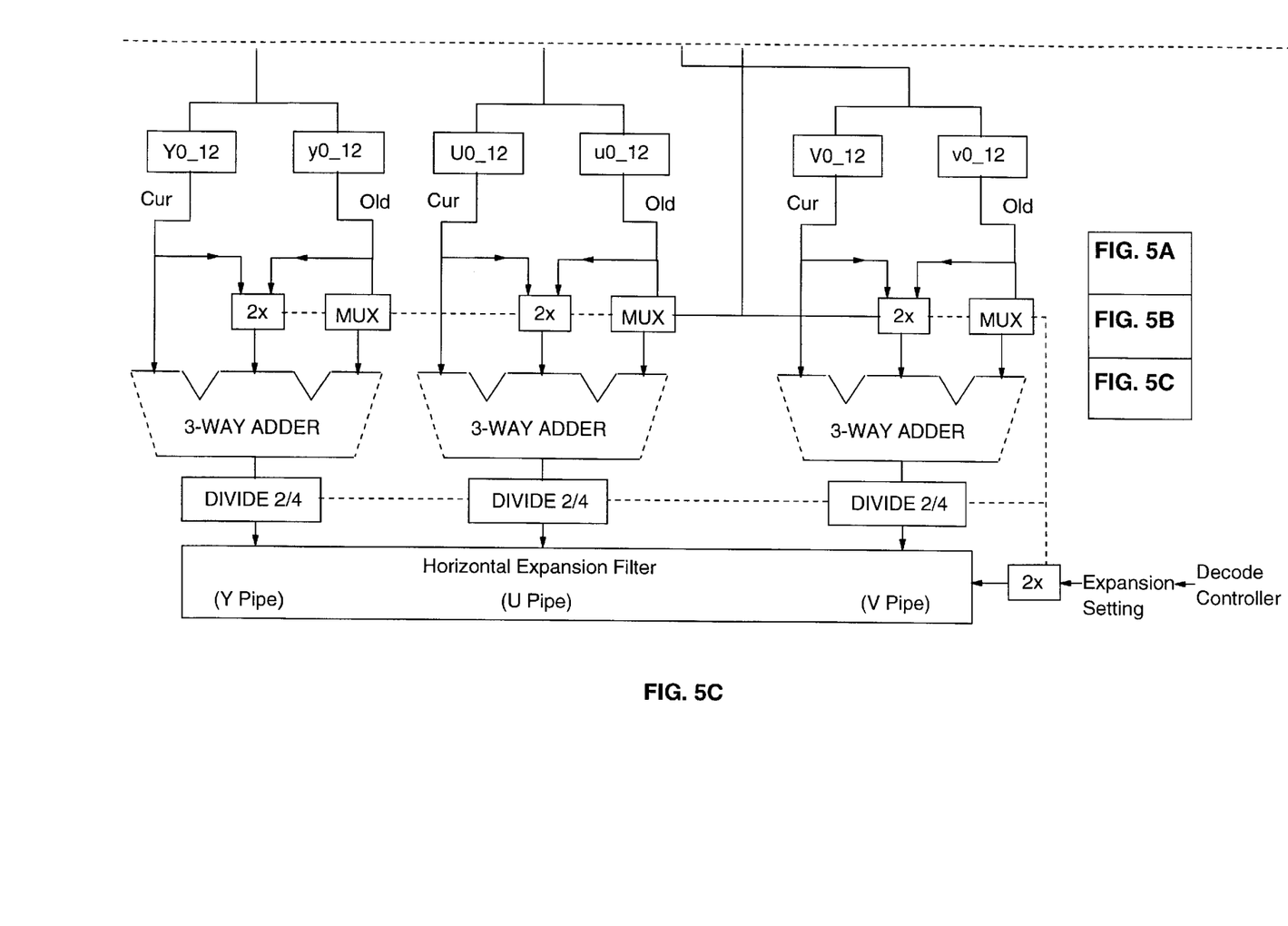

Data flow of display portion 4 of decimation unit 2 is shown if FIG. 5. The Luminance (Y) and Chrominance (UV) data are stored in separate imbedded memory buffers 13 and 15 of video buffers 7 after being read from external memory. Each imbedded memory is physically a dual-port array, for example a 32×32 array, located as part of video buffers 7. Each array is managed as if it were a ping-pong buffer, that is, at any one time data is being read from one half of the array, while it is possible that the other half is being written to by display portion 4 of decimation unit 2. Expansion filter 10 draws data out of the buffers at a rate that can supply filtered data seamlessly to display 11.

The display fetch logic indicates when there is enough data in video buffers 7, and from that point on expansion filter 10 simply begins to fetch data sequentially from video buffers 7, assuming that the display fetch logic is able to keep filling video buffers 7 with new data. The writes to video buffers 7 are completely controlled by the display fetch logic, and the writes to the array tend to proceed from the top of the array to the bottom with no order change.

FIG. 5 shows the data path of the display portion of the decimation unit. As data is read from external memory and written into video buffers 7, the data is either sent through logic in display portion 4 of decimation unit 2 that duplicates the horizontal reduction function found in decode portion 3 of decimation unit 2, or the data passes straight into video buffers 7 without reduction. When performing memory space reduction, the I and P pictures will be reduced prior to being written into video buffers 7 so that they match the state of the B pictures prior to reception in the expansion filter 10. Since the B pictures are already reduced they would pass straight into video buffers 7.

The Y buffer 13 comprises two sections, for example two 64 byte sections. In the case of two 64 byte sections, each section is 16 entries by 4 bytes wide. The Y buffer address is then a byte address of each luminance pixel within the buffer. Data is read into staging registers 30 and 31 and then passes through adders 32 before being fed into expansion filter 10. The staging registers 30 & 31, and adders 32 comprize the vertical decimation portion of the display unit. Two reads of the array must be performed to produce a single data byte. In cases that do not require vertical interpolation, the address of the second operand of the add function is forced to the same address as the first so that the two operands are the same, and the average calculation has no effect.

For I or P pictures, horizontal decimation may be required, and this decimation takes place before the data is stored in Y buffer 13 and UV buffers 15. The decimation in this case is a simple 1:1 average, such that for a 4 byte transfer from memory, only two bytes are stored in Y buffer 13 or UV buffer 15.

Data from UV buffer 15 is read in a similar manner except that the UV bytes are in ordered pairs due to the way they are stored in external memory. Therefore, two bytes are read at a time, one for U data and one for V data. Once loaded into staging registers 30 and 31, the interpolation action is the same as it is for luminance. Three bytes, comprising Y, U, and V are then sent in parallel into the pipeline of the horizontal filter.

For I or P pictures, vertical interpolation may be required. Two buffer accesses are needed to fetch the two bytes of data involved in the interpolation. For this case, each Y buffer section is sub-divided into two sections, for example two 32 byte sections. The first section contains the current line data, and the second section contains the previous line data at the identical horizontal position of the current line. In FIG. 5, the previous line data is indicated by lower case. One byte is read from the current line section into Cur stage register 30, and a second byte is read from the previous section into Old stage register 31. The interpolation of these two values is read from the output of adder 32 after resealing (right shifting) by a power of 2. The interpolation is applicable to letterbox resizing as well as other resizings required for multiple sized MPEG source display.

For B pictures, any horizontal compression or vertical interpolation has already taken place in decode portion 3 of decimation unit 2. For B pictures, the data flows through the stages depicted in FIG. 5 unaltered.

More complex interpolations than just averaging are allowed and are controlled on a raster line-by-line schedule. 3:1-1:1 weighting is used for letterboxing vertical reductions and expansions to the image as was done in decode portion 3 of decimation unit 2. This ¾-¼ weighting can be applied to Y and/or UV simultaneously.

Display fetch unit 8 monitors the fullness of video buffers 7, and initiates a fetch when the last byte for that particular buffer is being read by expansion filter 10. Display fetch unit 8 then responds over the next few cycles by queuing up a memory request for data to backfill. When the data writing to video buffers 7 from display portion 4 of decimation unit 2 needs to be compressed first, the rate at which the array can backfill the depleted area naturally is reduced. To compensate for this, display fetch unit 8 will double the data request size, thus resulting in a filled video buffer 7 after horizontal compression.

After the vertical interpolation for letterbox or ¾ size picture take place, expansion filter 10 may double the size of the image horizontally if the picture was compressed. This compression may have taken place in decode portion 3 of decimation unit 2 (B pictures), or display portion 4 of decimation unit 2 (I or P pictures), but the horizontal expansion doubling will occur for all pictures. This method tends to produce a smooth sequence of images.

In a preferred embodiment of the invention as shown in FIG. 1, motion compensation unit 5 sends macroblock data, containing video data, to the memory control unit 1. However, if decimation unit 2 is in the ON mode before the macro block data is received by memory control unit 1, then the macroblock data is intercepted by decode portion 3 of decimation unit 2. Decimation unit 2 decimates the macroblock data accoding to a selectable algorithm, stores the decimated macroblock data in decimate buffer 6, and then passes the decimated macroblock data to memory control unit 1.

Display portion 4 of decimation unit 2 receives the decoded picture in scan line form after it has been processed by memory control unit 1. Display fetch unit 8 is made aware of the transferring of the decimated macroblock data from memory control unit 1 to display portion 4 of decimation unit 2, and alters the data fetch quantity so as to more appropriately keep video buffer 7 full while decimation unit 2 is operating. Display portion 4 of decimation unit 2 utilizes the same selection of algorithms as decode portion 3 of decimation unit 2 in order to decimate the incoming picture.

The control signals, which give proper protocol for macroblock data transmission from motion compensation unit 5, are broadcast from memory control unit 1. Once again, if decimation unit 2 is in the ON mode, then decimation unit 2 will intercept and translate the control signals so that data transmission from memory control unit 1 will agree with the protocol as required by decimation unit 2.

The system in FIG. 1 is controlled and synchronized by decoder controller 9, such that all portions of the system coordinate to present a consistent picture. Decoder controller 9 coordinates to such a degree as to control this system to be capable of applying a selected algorithm to either luminance data, or the chrominance data, or both.

In another embodiment of the invention, the data will transfer the same as for the preferred embodiment with some alterations. In this alternative embodiment, a "letterbox" presentation is created. The macroblock data is vertically decimated ¾, and this, as displayed on a conventional 4:3 display monitor creates a 16:9 "letterbox" presentation. In this case, the decoded I and P macro blockds proceed through decimation unit 2 unaltered, and the B macroblocks are vertically decimated by decode portion 3 (decoding stage) of decimation unit 2. Display fetch unit 8 increases the size of the scan line fetches for I and P pictures, and fetches these scan lines in such a manner as to allow vertical interpolation to the same letterbox size as was performed by the decode side on the B picture. Thus, all I, P, and B pictures smoothly display a letterbox picture sequence.

In yet another embodiment of the invention, the amount of memory space required for the storage of the decoded B frame is reduced, while the high quality for the reference frames (I,P) is maintained. In this case, the B pictures are horizontally decimated by 2:1 in the decoding stage. Again, the I and P pictures proceed through decode portion 3 of decimation unit 2 unaltered. On the display side, display fetch unit 8 increases the size of the scan line fetches for I and P pictures, and horizontally decimate these lines using the same 2:1 algorithm. The B picture scan lines need not go through this reduction step. When the I, P, and B lines in turn reach the expansion filter 10, the filter 10 is set to allow a 1:2 expansion, thus regaining their original size. This process could be done to luminance data, or the chrominance data, or both. The reduction and subsequent re-expansion of the I and P pictures by display portion 4 of decimation unit 2 is done so that consistency is maintained for the video of a group of pictures, and thus the reduced resolution of any one picture is not noticeable.

In another embodiment, both "letterbox" presentation and horizontal decimation/expansion are performed at the same time. This creates a "letterbox" presentation and still saves some space in the external frame buffer memory.

In another embodiment, a small picture presentation is created. Decode portion 3 of decimation unit 2 reduces the displayed image by ¾ vertically, employing the same algorithms used for letterbox presentation. The remaining space on display 11 is used for on-screen graphics. By additionally reducing B frames in decode portion 3, the required external memory to decode the video is reduced, allowing more of the external memory to be allocated toward on screen graphics, i.e. for resolution or color enhancement.

Any of the above embodiments may be used to decode video data for information handling systems including high definition television.

While the invention has been described with respect to certain preferred embodiments and exemplifications, it is not intended to limit the scope of the invention, but solely by the claims appended hereto.

What is claimed is:

1. A method for decoding and displaying video data having I-coded, P-coded and B-coded pictures, said method comprising:
   (i) motion compensating the P-coded, and B-coded pictures during a decode phase;
   (ii) decimating the B-coded pictures during said decode phase and prior to frame buffer storage thereof; and
   (iii) decimating the I-coded and P-coded pictures during a display phase and prior to display thereof.

2. The method of claim 1, wherein said decimating (ii) comprises vertically decimating said B-coded pictures.

3. The method of claim 2, wherein said I-coded, P-coded, and B-coded pictures include luminance data and chrominance data, and wherein said decimating (ii) comprises vertically decimating said B-coded pictures' luminance data solely.

4. The method of claim 2, wherein said decimating (iii) comprises vertically decimating said I-coded and P-coded pictures.

5. The method of claim 4, wherein said I-coded, P-coded and B-coded pictures include luminance data and chrominance data, and wherein said decimating (ii) comprises vertically decimating said B-coded pictures' luminance data solely and said decimating (iii) comprises vertically decimating said I-coded and P-coded pictures' luminance data solely.

6. The method of claim 2, further comprising intercepting said B-coded pictures by a decode portion of a decimation unit subsequent to said motion compensating (i) of said B-coded pictures, wherein said vertically decimating said B-coded pictures is performed during said intercepting.

7. The method of claim 1, wherein said decimating (ii) comprises horizontally decimating said B-coded pictures.

8. The method of claim 7, wherein said I-coded, P-coded, and B-coded pictures include luminance data and chrominance data, and wherein said decimating (ii) comprises horizontally decimating said B-coded pictures' luminance data solely, chrominance data solely, or both luminance and chrominance data.

9. The method of claim 7, further comprising intercepting said B-coded pictures by a decode portion of a decimation unit subsequent to said motion compensating (i), wherein said horizontally decimating said B-coded pictures is performed during said intercepting.

10. The method of claim 7, wherein said decimating (iii) comprises horizontally decimating said I-coded and P-coded pictures.

11. The method of claim 10, wherein said I-coded, P-coded and B-coded pictures include luminance data and chrominance data, and wherein said decimating (ii) comprises horizontally decimating said B-coded pictures' luminance data solely and said decimating (iii) comprises horizontally decimating said I-coded and P-coded pictures' luminance data solely, chrominance data solely, or both luminance and chrominance data.

12. The method of claim 1, wherein said decimating (ii) comprises both vertically and horizontally decimating said B-coded pictures.

13. The method of claim 12, further comprising intercepting said B-coded pictures by a decode portion of a decimation unit subsequent to said motion compensating (i), wherein said vertically and horizontally decimating said B-coded pictures is performed during said intercepting.

14. The method of claim 13, wherein said decimating (iii) comprises both vertically and horizontally decimating said I-coded and P-coded pictures.

15. The method of claim 1, wherein said decimating (ii) and said decimating (iii) comprise decimating said B-coded pictures and said I-coded and P-coded pictures, respectively, to a common amount of decimation.

16. The method of claim 1, further comprising, after said decimating (ii) and said decimating (iii), expanding said B-coded pictures in said display phase and said I-coded and P-coded pictures in said display phase in order that perceptual quality of said B-coded pictures and said I-coded and P-coded pictures is similar.

17. The method of claim 1, wherein said decimating (ii) comprises horizontally decimating said B-coded pictures during said decode phase and said decimating (iii) comprises horizontally decimating said I-coded and P-coded pictures during said display phase, and wherein said method further comprises horizontally expanding said B. I and P pictures by a same ratio as said B, I and P pictures were horizontally decimated.

18. A method for decoding macroblock data in a digital video decoding system having a memory control unit for receiving and processing said macroblock data, and for sending control signals, a motion compensation unit for processing and receiving said macroblock data, a decimation unit having a decoder portion, a display portion and a decimate buffer, a display unit, and a plurality of buffers including at least one video buffer, said method comprising:

(i) processing said macroblock data in said motion compensation unit;

(ii) intercepting and processing B-coded pictures of said macroblock data in said decoder portion of said decimation unit after said processing by said motion compensation unit;

(iii) storing and passing said macroblock data through said decimate buffer after said processing by said decoder portion of said decimation unit;

(iv) forwarding said macroblock data to said memory control unit for buffering in said plurality of buffers, said forwarding occurring after said passing thereof through said decimate buffer;

(v) receiving said macroblock data in said display portion of said decimation unit after said forwarding thereof to said memory control unit; and (vi) processing said macroblock data in said display portion of said decimation unit to facilitate display thereof by said digital video decoding system.

19. The method of claim 18, wherein said macroblock data comprises B-coded, I-coded and P-coded pictures, and wherein said intercepting and processing (ii) said macroblock data in said decoder portion of said decimation unit comprises decimating said B-coded pictures.

20. The method of claim 19, wherein said decimating of said B-coded pictures in said decode portion of said decimation unit comprises vertically decimating said B-coded pictures in said decode portion of said decimation unit.

21. The method of claim 20, wherein said processing (vi) comprises vertically decimating said I-coded and P-coded pictures in said display unit of said digital video decoding system prior to display thereof.

22. The method of claim 21, further comprising creating a letterbox presentation from said macroblock data for display, and wherein said decimating said macroblock data in said decoder portion of said decimation unit comprises vertically decimating said macroblock data to ¾ size.

23. The method of claim 22, wherein said letterbox presentation has a 16:9 format.

24. The method of claim 19, wherein said macroblock data further comprises luminance data and chrominance data, and wherein said vertically decimating said B-coded pictures in said decode portion of said decimation unit comprises vertically decimating said B-coded pictures' luminance data solely.

25. The method of claim 18, wherein said macroblock data comprises I-coded, B-coded and P-coded pictures, and wherein said intercepting and processing (ii) said macroblock data in said decoder portion of decimation unit comprises horizontally decimating said B-coded pictures in said decode portion of said decimation unit.

26. The method of claim 25, wherein said processing (vi) comprises horizontally decimating said I-coded and P-coded pictures in said display unit of said digital video decoding system.

27. The method of claim 26, wherein said digital video decoding system further includes an expansion filter, and wherein said processing (vi) comprises expanding said macroblock data in said expansion filter prior to display thereof.

28. The method of claim 26, wherein said horizontally decimating said B-coded pictures in said decode portion of said decimation unit and said horizontally decimating said I-coded and P-coded pictures in said display unit employ a same amount of decimation.

29. The method of claim 28, further comprising horizontally expanding said B-coded, I-coded and P-coded pictures by a same ratio as said B-coded, I-coded and P-coded pictures were horizontally decimated.

30. The method of claim 29, wherein said horizontally decimating comprises horizontally decimating said B-coded, and said I-coded and P-coded pictures approximately 2:1, and horizontally expanding said B-coded, I-coded and P-coded pictures approximately 1:2.

31. A digital video decoding system for decoding macroblock data, said digital video decoding system comprising:

a memory control unit for receiving and processing said macroblock data;

a motion compensation unit for motion compensating P-coded and B-coded pictures of said macroblock data;

a decimation unit coupled to said memory control unit and said motion compensation unit, said decimation unit having a decoder portion, and a decimate buffer;

a plurality of buffers including at least one video buffer, said plurality of buffers being coupled to said memory control unit; and wherein said decimation unit is coupled between said motion compensation unit and said memory control unit for intercepting at least some of said macroblock data when output from said motion compensation unit for forwarding to said memory control unit, said decimation unit including means for decimating B-coded pictures of said macroblock data prior to forwarding thereof to said memory control unit for buffering in said plurality of buffers.

32. The system of claim 31, wherein said means for decimating B-coded pictures comprises means for vertically decimating said B-coded pictures.

33. The system of claim 32, wherein said I-coded, P-coded and B-coded pictures include luminance data and chrominance data, and wherein said means for decimating comprises means for vertically decimating said B-coded pictures' luminance data solely.

34. The system of claim 32, wherein said digital video decoding system further includes a display unit for retrieving macroblock data from said plurality of buffers for display, and wherein said display unit comprises means for vertically decimating I-coded and P-coded pictures of said macroblock data.

35. The system of claim 31, wherein said means for decimating comprises means for horizontally decimating said B-coded pictures.

36. The system of claim 35, wherein said I-coded, P-coded and B-coded pictures include luminance data and chrominance data, and wherein said means for decimating comprises means for horizontally decimating said B-coded pictures' luminance data solely, chrominance data solely or both luminance and chrominance data.

37. The system of claim 35, further comprising a display unit for retrieving macroblock data from said plurality of buffers for display, said display unit including means for horizontally decimating said I-coded and P-coded pictures prior to said display.

38. The system of claim 31, wherein said means for decimating comprises means for both vertically and horizontally decimating said B-coded pictures.

39. The system of claim 38, further comprising a display unit for retrieving macroblock data from said plurality of buffers for display, said display unit including means for vertically and horizontally decimating said I-coded and P-coded pictures.

40. The system of claim 31, further comprising a display unit for retrieving macroblock data from said plurality of buffers for display, said display unit including means for decimating said I-coded and P-coded pictures prior to said display, and wherein said means for decimating said B-coded pictures of said macroblock data in said decimation unit and said means for decimating said I-coded and P-coded pictures of said macroblock data in said display unit decimate said B-coded pictures and said I-coded and P-coded pictures to a same perceptual quality.

41. The digital video decoding system of claim 31, wherein said system comprises an information handling system.

42. The digital video decoding system of claim 31, wherein said system comprises a high definition television, said high definition television including a display unit and a display screen, said display unit retrieving macroblock data from said plurality of buffers for display on said display screen.

* * * * *